US007864887B2

(12) United States Patent
Lui et al.

(10) Patent No.: US 7,864,887 B2
(45) Date of Patent: Jan. 4, 2011

(54) NONCOHERENT SYMBOL CLOCK RECOVERY SUBSYSTEM

(75) Inventors: Gee L. Lui, Westminster, CA (US); Kuang Tsai, Santa Ana, CA (US)

(73) Assignee: The Aerospace Corporation, El Segundo, CA (US)

( * ) Notice: Subject to any disclaimer, the term of this patent is extended or adjusted under 35 U.S.C. 154(b) by 744 days.

(21) Appl. No.: 11/827,237

(22) Filed: Jul. 11, 2007

(65) Prior Publication Data

US 2009/0016467 A1 Jan. 15, 2009

(51) Int. Cl.
*H03K 9/00* (2006.01)
(52) U.S. Cl. .................. 375/316; 375/322; 375/326; 375/342; 375/343; 375/350; 455/133; 455/136; 455/296
(58) Field of Classification Search .................. 375/135, 375/150, 219, 243, 295, 299, 306, 316, 342, 375/343, 354, 359, 259, 271, 294, 322, 324, 375/326, 327, 350, 371
See application file for complete search history.

(56) References Cited

U.S. PATENT DOCUMENTS

| 5,465,412 | A * | 11/1995 | Mueller et al. | 455/296 |
|---|---|---|---|---|
| 7,369,631 | B1 * | 5/2008 | Gifford et al. | 375/346 |
| 7,447,271 | B2 * | 11/2008 | Akita et al. | 375/267 |
| 7,680,221 | B2 * | 3/2010 | Lillo et al. | 375/343 |
| 2003/0227963 | A1 * | 12/2003 | Dafesh | 375/149 |
| 2004/0002313 | A1 * | 1/2004 | Peace et al. | 455/234.1 |
| 2005/0132313 | A1 * | 6/2005 | Lindkvist | 716/6 |

* cited by examiner

*Primary Examiner*—Shuwang Liu
*Assistant Examiner*—Hirdepal Singh
(74) *Attorney, Agent, or Firm*—K & L Gates

(57) ABSTRACT

A symbol clock recovery subsystem uses a tap delay line having a set of delays, uses a clock bank of samplers providing time-staggered sampled noncoherently received signals, and uses a set of mean magnitude generators, in channelized form, for providing a set of mean magnitudes to a maximum selector for selecting a maximum one of the time-staggered sampled received signals having the greatest signal to noise ratio so as to provide a signal effectively occurring at symbol epoch time for demodulating a symbol stream in a digital communication system receiver.

17 Claims, 3 Drawing Sheets

SYMBOL CLOCK RECOVERY SUBSYSTEM

SYMBOL CLOCK RECOVERY SUBSYSTEM

Re/Im QPSK SIGNAL COMPONENTS

|r| QPSK SIGNAL COMPONENTS

NONCOHERENT SYMBOL CLOCK RECOVERY SUBSYSTEM

STATEMENT OF GOVERNMENT INTEREST

The invention was made with Government support under contract No. FA8802-04-C-0001 by the Department of the Air Force. The Government has certain rights in the invention.

FIELD OF THE INVENTION

The invention relates to the field of noncoherent communications. More particularly, the present invention relates to recovering symbol clocks in noncoherent communications systems for improved reception of digital data streams.

BACKGROUND OF THE INVENTION

Digital communication systems transmit data by various carrier modulation techniques using tracking coherency between a transmit clock and a like receiver clock. Gaussian minimum shift keying (GMSK) is a form of continuous phase modulation having compact spectral occupancy by choosing a suitable bandwidth time product parameter in a Gaussian filter. GMSK is an attractive modulation method for all high throughput frequency division multiple access satellite communication systems where only a limited system bandwidth is available with the transmitters operating at maximum power output efficiency. GMSK communications systems are typically coherent communication systems.

A GMSK receiver for an additive white Gaussian noise channel demodulates the received signal by coherent demodulation into estimated output data stream using a local carrier reference clock. The receiver demodulates by filtering the received signal using a bank of Laurent filters that filter the demodulated received signal into a symbol sequence. A Viterbi decoder searches the symbol sequence for the most probable transmitted data sequence as an estimate of the original NRZ formatted data stream. The symbol sequence has a predetermined alphabet of M symbols as an M-ary symbol modulation method. A typical coherent receiver for a 2-ary GMSK signal is based on a pulse amplitude modulation representation of continuous phase modulated signals using Laurent matched filters matched to the amplitude modulated pulses in the pulse amplitude modulation representation, and further employs the Viterbi algorithm to optimally demodulate the symbol sequence.

U.S. Pat. No. 7,072,414 issued on Jul. 4, 2006 to Lui, entitled GMSK precoding communication method, is directed to a data precoding algorithm implemented in a modulator of a transmitter to substantially improve the resulting bit error rate performance of the continuous phase modulated receivers, such as Gaussian minimum shift keying receivers, without the use of differential decoders while preserving the spectral occupancy of the GMSK signals. The bit error rate is reduced using the precoding method for GMSK signals with memory of L. The GMSK receiver includes a filter bank and Viterbi decoder. A header on the bit stream is used for determining symbol timing for sampling of the output of the filter bank. The timing for sampling is coherent. The header provides a-priori timing for proper sampling of the bit stream. The use of a-priori timing produces inaccurate sampling times. Prior GMSK coherent communications systems have required complicated coherent tracking loops and have increased the sampling rate that requires additional components and power.

Other communication systems use binary phase shift keying (BPSK), quadrature phase shift keying (QPSK), and M-ary phase shift keying. The communication signal is a square wave in nature and digital tracking transition loops are used for noncoherent bit synchronization. That is, the digital tracking transition loop is designed to track the baseband square waves of demodulated received signals without necessarily matching a transmit clock with a like receiving clock. The digital tracking transition loop performs optimally when the square wave signals are received in the presence of the additive white Gaussian noise. Digital transition tracking loops as part of a GMSK timing recover loop have been applied to demodulated GMSK received signals that are highly distorted square wave signals. The GMSK timing recovery loop operates upon the demodulated received GMSK signal using forms of a squaring loop or frequency doubler followed by a phase locked loop for bit timing recovery. The timing clock for timing recovery in the GMSK timing recovery loop is created by squaring the received demodulated signal, and the phase lock loop is tuned to the clock frequency for bit timing recovery. The demodulated GMSK received baseband signal containing data information, however, is severely distorted due to the Gaussian filtering at small bandwidth time products where the 3 dB cut-off frequency of the Gaussian filter is smaller than the data rate of the baseband signaling. Therefore, for small bandwidth time products of GMSK Gaussian filters, both prior GMSK timing recovery loops and digital tracking loops are not capable of recovering the timing information based on the received analog Gaussian filter response waveform.

U.S. Pat. No. 6,411,661, issued to Nguyen on Jun. 25, 2002, entitled digital timing recovery loop for GMSK demodulators, is directed to an improved GMSK timing recover loop in a GMSK receiver for providing a bit synchronization timing signal that is used for reconstructing a data sequence. The GMSK timing recovery loop includes a hard limited and a conventional digital tracking transition loop that has been used in binary phase shift keying (BPSK) and quadrature pulse shift keying (QPSK) for noncoherent communications. The improved GMSK timing recovery loops operates at baseband and provides reduced bit timing synchronization jitter for reducing bit error rates.

GMSK, QPSK, BPSK, and like coherent communications require sampling of the incoming data stream by matching a transmit clock with a like receiver clock and various means have been employed to accurately and rapidly determine the sampling timing based upon coherency. Coherency provides for locking on external transmit clock timing by adjusting delays in an internal clock. Such coherent systems are inherently complicated and required coherent tracking loops. GMSK, QPSK, and BPSK often rely on noncoherent tracking. However, without a dependence upon a precise internal clock, noncoherent tracking is often less effective in recovering an incoming data stream. Noncoherent systems rely on noncoherent tracking of the digital bit stream. However, noncoherent tracking still requires the generation of a precise sampling signal. In a noncoherent digital data communication system an important subsystem function of the receiver is that of recovering the data symbol timing from the received signal that is corrupted by channel noise. Bit time tracking is accomplished using complicated noncoherent tracking loops, or precoding, or headers, while assuming initial bit timing a-priori leading to delays in bit and symbol synchronization and data recovery. These timing functions require high sampling rates that require an excessive amount of power to implement often requiring the excessive use of high speed analog to digital converters. These and other disadvantages are solved or reduced using the invention.

SUMMARY OF THE INVENTION

An object of the invention is to provide a noncoherent symbol clock recovery system.

Another object of the invention is to provide a noncoherent symbol clock recovery system for providing a signal indicating timing of a received symbol stream.

Another object of the invention is to provide a noncoherent symbol clock recovery system for providing a signal indicating timing of a received symbol stream in a baseband digital communication system.

Yet another object of the invention is to provide a noncoherent symbol clock recovery system having a tap delay line for providing time staggered replicas of a received signal.

Still another object of the invention is to provide a noncoherent symbol clock recovery system having tap delay line for providing time staggered replicas of a received signal for determining a maximal one of the replicas.

A further object of the invention is to provide a noncoherent symbol clock recovery system having tap delay line for providing a time staggered replicas of a received signal for determining a maximal one of the replicas for providing an indication of symbol timing.

The invention is directed to a clock recovery subsystem to recover the symbol epoch timing of a random data modulated digital communication signal that may be noncoherently received through a noisy channel. The symbol epoch recovery subsystem is simple to implement. The signal observation window that is the acquisition time measured in symbols, needed to achieve a high probability of correct symbol epoch timing recovery in a random data signal is short in time for operational signal-to-noise ratios experienced in practical communication systems. In the preferred form, the symbol clock recovery subsystem can be embedded in a baseband digital communication receiver. A simple tap-delay line and clock bank are used to sample the received signal at different timing offsets to generate sampled time staggered replicas. The symbol clock recovery system uses the sampled time staggered replicas that are respectively fed through mean magnitude generators providing mean magnitudes that are insensitive to carrier signal phase offset. A decision metric by an argument maximum selector resolves the timing hypotheses in the subsystem by selecting a maximum one of the mean magnitudes for selecting one of the sampled time staggered replicas that can then be used for symbol synchronization timing. An advantage of the symbol clock recovery subsystem is the simple implementation and the rapid acquisition performance even in relatively very noise channels. The preferred form is a simple symbol clock recovery subsystem that is applicable to virtually all noncoherent digital communication receivers.

The symbol clock recovery subsystem is based upon the recognition that the mean magnitude of the received signal samples taken near the peak of the received data pulses is expected to be larger than that taken farther from the peak of the received data pulses. This results in the use of the mean magnitude of the received signal samples as a simple to implement metric for the proposed symbol clock recovery subsystem. By determining which of the tapped delay signal is maximum at any point in time, the subsystem effectively provides a timing offset for rapid acquisition of the signal at its maximum value having the largest signal-to-noise ratio. The subsystem uses magnitude averages of tapped sampled received signals for selecting one of the tapped channel with the maximum signal for effective high speed sampling while also providing the maximum signal for improved symbol and hence data recovery. These and other advantages will become more apparent from the following detailed description of the preferred embodiment.

DETAILED DESCRIPTION OF THE PREFERRED EMBODIMENT

Figure 1:
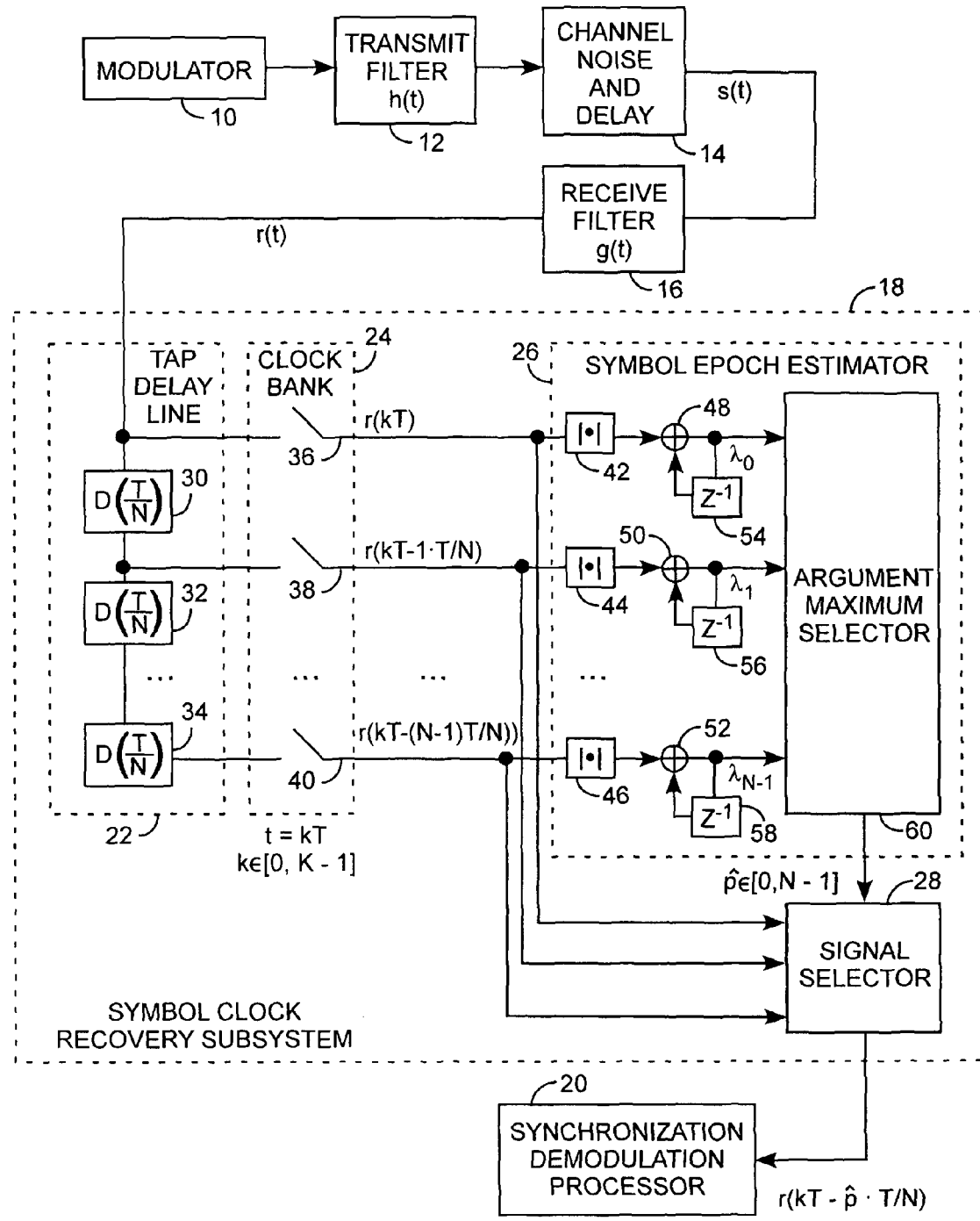
FIG. 1 is a block diagram of a symbol clock recovery system.

An embodiment of the invention is described with reference to the figures using reference designations as shown in the figures. A baseband digital communication system may use a variety of modulation methods such as GMSK, QPSK, and BPSK conventional modulation methods. Referring to FIG. 1, a modulator 10 provides a modulated symbol stream fed into a transmit filter 12 filter having a h(t) filter response for providing a filtered transmit signal that is transmitted as a transmitted signal s(t) over a communication channel having channel noise and delay 14. The transmitted signal s(t) with noise and delay is received by a receive filter 16 having a g(t) response for providing a received signal r(t) that is a filtered received signal having a complex envelope. The received signal r(t) is fed into a symbol clock recovery subsystem 18 for providing one of a plurality of sampled received signals as a selected received signal that is fed to a synchronization demodulation processor 20 for demodulating a symbol stream modulated in the received signal r(t). The transmitted signal s(t) is also a received baseband signal with additive noise that is filtered by the receive filter 16 providing the received signal r(t) that is a filtered received signal. The modulator 10 and transmit filter 12 are typically disposed in a transmitter, not shown, and the receive filter 16, symbol clock recovery subsystem 18, and synchronization processors 20 are typically disposed in a receiver, not shown, with the transmitter and receiver combining as a baseband digital communications system.

Referring specifically to the subsystem 18, the received signal r(t) is fed into a tap delay line 22 providing delay signals to a clock bank 24 for providing sampled received signals to a symbol epoch estimator 26 and a signal selector 28 for providing a selection signal p̂ to a signal selector 28 for selecting one of the sampled received signal as a selected received signal. The received signal r(t) from the receive filter 16 is delayed by the tap delay line 22 having (N−1) delays 30, 32, through 34, for providing delayed received signals that are N time-staggered replicas of the received signal r(t). The N time-stagger replicas effectively provide for increased sampling of the received signal so as to conserve power requirements. The delayed received signals have uniform delay spacing of T/N second, and hence, are time-staggered. The term T is the transmitted symbol duration time. The term N is a positive integer defining the uniform spacing. Hence, the N number of D(T/N) delays 30, 32, through 34 provide N taps of the tap delay line 22 for providing the delay received signals that are tapped time-staggered replicas of the received signal r(t). The tap delay line 22 is connected to the output of the receive filter 16 for T or more seconds.

The tap delay line delays 30, 32, through 34 are sampled simultaneously at time t every T seconds by the clock bank 24 having a respectively plurality of samplers 36, 38, through 40 for respectively providing sampled received signals r(kT), r(kT−1·T/N), through r(kT−(N−1)T/N)). The term K is a number of consecutive symbols of an observation time window that is sufficiently long in duration for signal acquisition. The term N is the number of samplers, and hence, the number of time segments per symbol time T. The sampling times at consecutive symbol times t equals kT, where k is the symbol index extending between 0 and K−1, that is, extending the number K of consecutive symbols. The sampled received signals r(kT), r(kT−1·T/N), through r(kT−(N−1)T/N)) from the clock bank are fed to the symbol epoch estimator 26 and the signal selector 28 for selecting one of the sampled received signals r(kT), r(kT−1·T/N), through r(kT−(N−1)T/N)) as the selected received signal.

The symbol epoch estimator 26 includes |●| magnitude generators 42, 44, through 46 for providing magnitudes of the sample received signals. The magnitudes of the sampled received signals are taken for each tap delays 30, 32, through 34, and hence, for each sampler, 36, 38, through 40. The magnitudes are fed into summers 48, 50, through 52 for providing current mean magnitudes that are fed to the argument maximum selector 60. During consecutive sampling, the mean magnitudes are fed to a $Z^{-1}$ storage elements 54, 56, through 58 that store the current mean magnitude as a prior mean magnitude for further summation by the summer 48, 50, 52. The magnitude generators 42, 44, and 46, and summers 48, 50, 52, and the storage elements 54, 56, through 58 function as in-channel accumulators for generating the mean magnitudes over K consecutive symbols for providing the $\lambda_0$, $\lambda_1$ through $\lambda_{N-1}$ mean magnitudes. The 1/Z storage elements store the $\lambda$ mean magnitude present values that are fed back to the summers for updating the mean magnitude values at each sampling time. The updated mean magnitude is stored in the storage element as the latest or prior mean magnitude. As such, the mean magnitude value from the magnitude generators 42, 44, through 46 are accumulated over the KT observation window. The mean magnitudes $\lambda$ are accumulated and fed to the symbol epoch selector 60 for selecting one of the sampled signals having the highest signal-to-noise ratio. The symbol epoch selector 60 determines which of the $\lambda$ mean magnitudes is the greatest over the K consecutive symbols. The symbol epoch selector 60 provides an estimated selection signal $\hat{p}\epsilon[0,N-1]$, where, $0 \leq \hat{p} \leq N-1$ for indicating one of the N sampled received signal having the highest signal-to-noise ratio and hence having symbol transitions most suitable for symbol timing acquisition. The selection signal $\hat{p}$ to the signal selector 28 selects one of the sample received signals r(kT), r(kT−1·T/N), through r(kT−(N−1)T/N)) as a r(kT−$\hat{p}$·T/N) where $\hat{p}$ is an estimated selection signal indicating the maximal sampled received signal over K consecutive symbol times. The tap-delay signal that produces the maximum $\lambda$ mean magnitude among all $\lambda$ mean magnitudes is then selected as the received signal for further use in a synchronization demodulation processor for baseband demodulation of the received signal into a received data stream. By the maximal mean magnitude and selecting the corresponding sampled received signal, the selected received signal providing the demodulation processor with a signal have a peak magnitude with maximum signal-to-noise at the symbol epoch without knowing the data symbol timing a-priori.

Figure 2A:
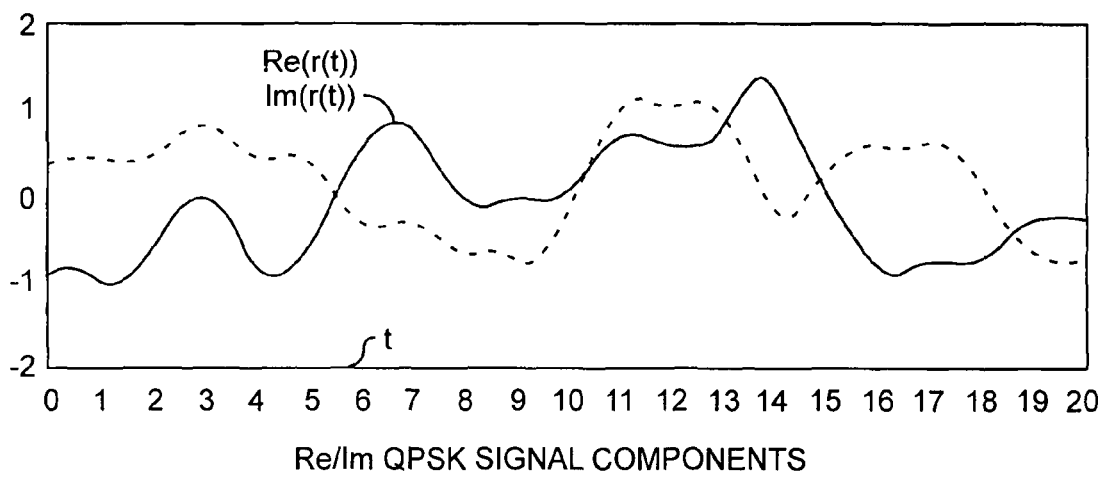
FIG. 2A is a plot showing real and imaginary QPSK signal components.
Figure 2B:
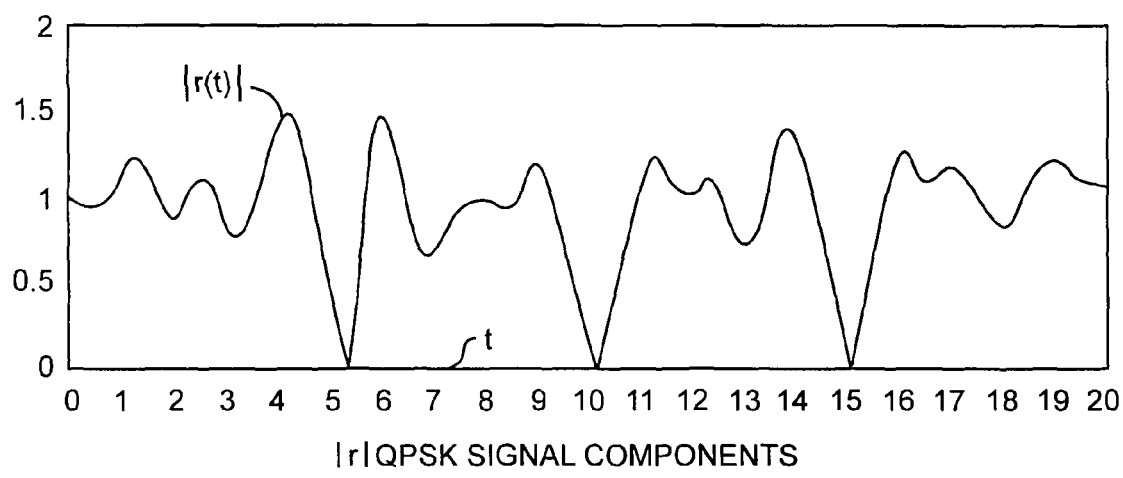
FIG. 2B is a plot showing |r| magnitudes of the QPSK signal components.

Referring to FIGS. 1, 2A, and 2B, the magnitude generators 42, 44, through 46 provide magnitudes from both the inphase Re(r(t)) and quadrature Im(r(t)) components of the received signal that may be a QPSK signal over sampling time t. Both Re(r(t)) and imaginary Im(r(t)) components vary over time. The signal magnitude |r(t)| is thus provided as a function of time t having maximums and minimums. The probability of correct symbol clock recovery may be assessed through computer simulation for various digital baseband modulation methods, such as BPSK and QPSK modulations. Both the rectangular shaped (REC-shaped) and square-root raised cosine (SRRC) transmit filter impulse responses for various filter roll-off factors can be considered. The SRRC filter impulse response is truncated by a window of 6 symbol times centered about a peak response and with a sampling rate of N=8 samples per symbol time. The criterion for correct symbol clock recovery is that the magnitude of the difference between the true signal delay and the estimated delay produced by the subsystem is no greater than a sample delay of T/N seconds.

Figure 3:
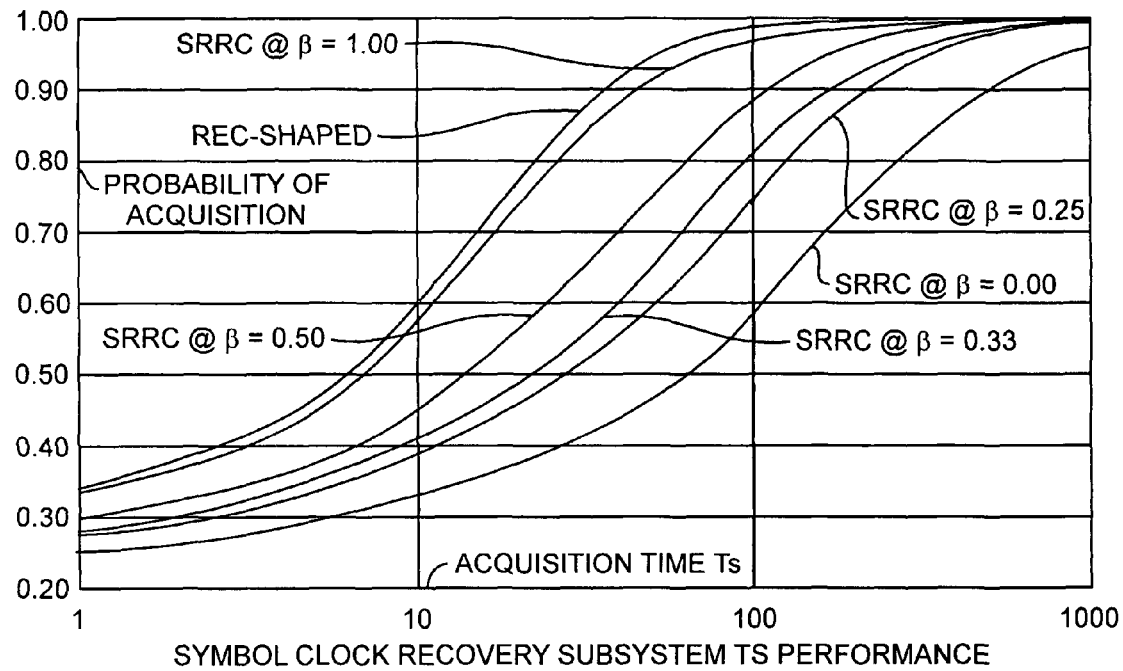
FIG. 3 is a plot showing symbol clock recovery subsystem performance verus acquisition time (TS).

Referring to FIGS. 1, 2A, 2B, and 3, and more particularly to FIG. 3, simulated probabilities of correct symbol clock recovery of the subsystem for both rectangular and square-root raised cosine filtered BPSK and QPSK modulations are shown. Computer simulations provide probabilities of correct symbol clock recovery versus acquisition time and symbol signal-to-noise ratios for the symbol clock recovery system 18.

The probability of correct symbol clock recovery of the subsystem versus acquisition time Ts in symbol times or KT for BPSK modulation with rectangular and SRRC transmit filters and matched-receive filters is shown. The symbol signal-to-noise ratio (SNR) in the simulation is set to 0.0 dB. The probability of correct clock recovery, irrespective of the transmit filter used, increases with increased acquisition time. The rectangular shaped BPSK signal with an integrate-and-dump (I&D) receive filter performs superior to the SRRC shaped BPSK signal, irrespective of the roll-off parameter. The SRRC shaped signal with larger β roll-off factor performs better than those signals with smaller β roll-off factors. At 0.0 dB symbol SNR, the subsystem can achieve nearly a 99% probability of correct symbol clock recovery with only a K=100 symbol time averaging window for the rectangular shaped BPSK signal with a matched-filter (MF) receive filter. This BPSK performance behavior is similar to the performance behavior for QPSK modulation. The rectangular and large roll-off SRRC shaped BPSK and QPSK signals have nearly equal performance whereas for small β roll-off factors SRRC shaped QPSK performs worse than BPSK with the same β roll-off factor.

Figure 4:
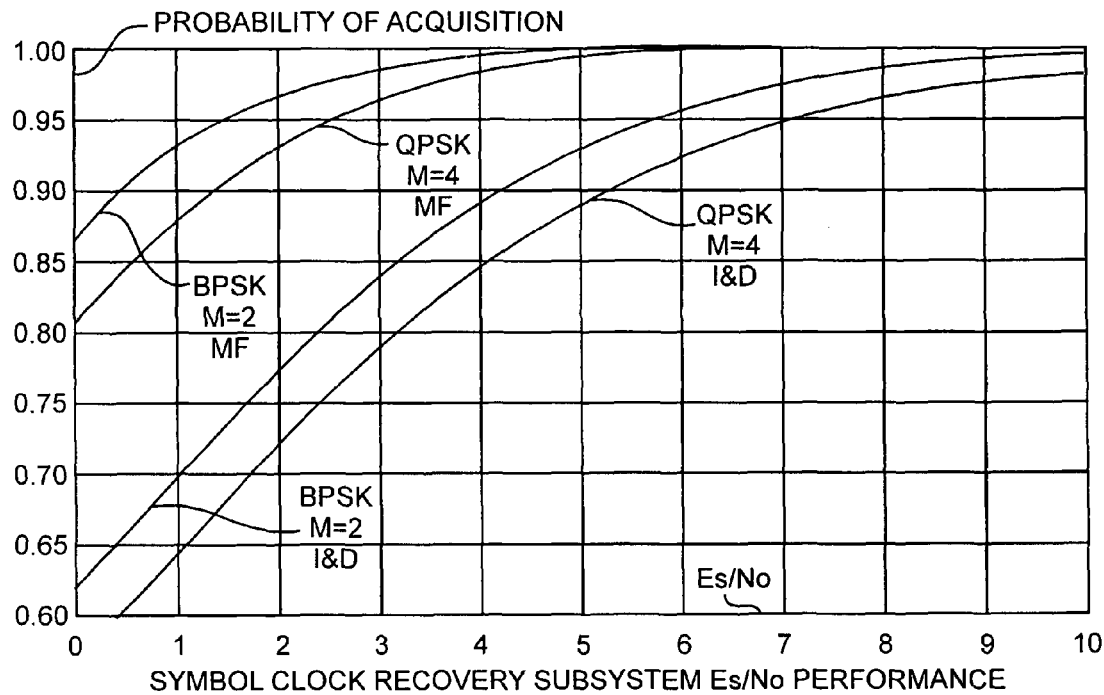
FIG. 4 is a plot showing symbol clock recovery subsystem performance verus SNR of Es/No.

Referring to all of the Figures, and more particularly to FIG. 4, the performances of the subsystem for SRRC shaped BPSK and QPSK modulations as a function of the symbol Es/No signal-to-noise ratio are shown. The β roll-off factor was selected to be 0.33 and a K=100 symbol time averaging window was used. The top two QPSK and BPSK modulation performance curves are for the use of match filters (HF) whereas the bottom two QPSK and BPSK modulation performance curves are for the use of integrate-and-dump (I&D) receive filters. The QPSK modulations method use a 4-ary symbol alphabet (M=4) whereas the PBSK modulations method use a 2-ary symbol alphabet (M=2). Performance of the subsystem is increased as the symbol SNR is increased. This performance is significantly better using matched filters as the receive filters rather than integrate and dump receive filters. For low symbol SNR, better performance is achieved with BPSK modulation than with QPSK modulation and the performance for QPSK modulation tends to be that of BPSK modulation for high symbol SNRs. To meet a 99% performance requirement with a K=100 symbol time averaging window, the required symbol SNRs of the subsystem were found to be about 3.2 dB and 4.5 dB, respectively, for the matched-filter detected and SRRC filtered BPSK and QPSK modulations. Simulation results show that, with an acquisition time of K=100 symbol periods, only a 4.5 dB symbol signal-to-noise is required to achieved a 99% probability of correct symbol clock recovery for a filtered QPSK signal with a matched-receive filter and a similar result is achieved for BPSK modulation at about a 3.2 dB of signal-to-noise ratio.

An advantage of the proposed symbol clock recovery subsystem is its simplicity to implement and the rapid acquisition performance even in noisy channels. The subsystem provides recovery of the symbol epoch of a random data modulated digital communication signal that is noncoherently received from a noisy channel. This symbol epoch recovery subsystem is very simple to implement. The signal observation window, acquisition time, needed to achieve a high probability of correct symbol epoch recovery in a random data signal is short for operational signal-to-noise ratios used in practical communication systems.

The symbol clock recovery subsystem uses mean magnitudes of the received signal samples, which are insensitive to carrier signal phase offset and also simple to instrument as is the decision metric for resolving the timing hypotheses in the subsystem. The symbol clock recovery subsystem involves the recognition that the mean magnitude of the received signal samples taken near the peak of the received data pulses is expected to be larger than that taken farther from the peak of the received data pulses. This results in the use of the mean magnitudes of the received signal samples as a simple to implement metric for the symbol clock recovery subsystem. The subsystem can be used in random data systems, noncoherent systems, and coherent systems for rapid acquisition of symbol timing. The invention is directed to time-staggered sampling and mean magnitude generation and selection. Those skilled in the art can make enhancements, improvements, and modifications to the invention, and these enhancements, improvements, and modifications may nonetheless fall within the spirit and scope of the following claims.

What is claimed is:

1. A subsystem for use in a receiver of a communications system, the subsystem comprising:
   a tap delay line connected to a receive filter for receiving a received signal from the receive filter and for providing delayed received signals;
   a clock bank for receiving the delayed received signals, the clock bank comprising a plurality of samplers for sampling the delayed received signals and providing respective sampled signals;
   an estimator for receiving the sampled signals, determining one of the sampled signals having a maximal signal-to-noise ratio as a maximal signal, based on determinations by the estimator of the mean magnitudes of the sampled signals, and providing a selection signal for indicating the maximal signal; and
   a signal selector for receiving the selection signal and selecting and providing the maximal signal from the sampled signals.

2. The subsystem of claim 1 wherein,
   the communications system is a digital communications system.

3. The subsystem of claim 1 wherein,
   the signal-to-noise ratio of the determined one of the sampled signals is greater than signal-to-noise ratios of the other sampled signals.

4. The subsystem of claim 1 wherein,
   the sampled signals are time staggered sampled signals.

5. The subsystem of claim 1 wherein,
   the subsystem is for receiving the received signal using M-ary modulation,
   the received signal is modulated by a symbol sequence, and
   the maximal signal has symbol transitions suitable for detection and use for tracking symbol timing of the symbol sequence.

6. The subsystem of claim 1 wherein,
   the received signal is transmitted as a transmitted signal from a transmitter of the communications system, and
   the transmitted signal and the received signal are modulated using M-ary symbol modulation.

7. The subsystem of claim 1 wherein,
   the received signal comprises one of a GMSK modulated signal, a QPSK modulated signal and a BPSK modulated signal,
   the received signal is a baseband signal, and
   the received signal comprises an inphase component and a quadrature component.

8. The subsystem of claim 1 wherein,
   the subsystem is a channelized subsystem wherein the delayed received signals and the sampled signals are provided in, and the mean magnitudes are generated in, respective channels.

9. The subsystem of claim 1 wherein,
   the tap delay line comprises 0 to N−1 delays for providing N delayed received signals, each of the N delayed received signals equally separated in time,
   the delayed received signals are time-staggered replicas of the received signal,
   the delayed received signals are N delayed received signals, and
   each of the delays is T/N, wherein T is a symbol time duration.

10. The subsystem of claim 1 wherein,
    the delayed received signals are N delayed received signals,
    the clock bank comprises N samplers representing N equal time segments of a symbol time duration,
    the sampled signals are N sampled signals,
    the sampled signals are $r(kT)$, $r(kT-1 \cdot T/N)$, through $r(kT-(N-1)T/N))$ sampled signals,
    k is a symbol index between 0 and K−1,
    K is a number of consecutive symbols, and
    T is the symbol time duration.

11. The subsystem of claim 1 wherein the estimator comprises,
    mean magnitude generators for generating mean magnitudes from the sampled signals, and
    a maximal selector for receiving the mean magnitudes and providing the selection signal.

12. The subsystem of claim 1 wherein the estimator comprises,
    mean magnitude generators for generating mean magnitudes from the sampled signals, the mean magnitude generators comprising magnitude generators for generating current magnitudes from the sampled signals, the mean magnitude generators comprising summers for summing prior mean magnitudes with the current magnitudes for generating the mean magnitude, the mean magnitude generators comprising storage elements for storing the prior mean magnitudes for addition by the summers for generating the mean magnitudes, each of the mean magnitude generators comprising a magnitude generator, a summer, and a storage element, the magnitude generator and the summer and the storage element combining as a mean magnitude accumulator for generating the mean magnitudes, and a maximal selector for receiving the mean magnitudes and providing the selection signal.

13. The subsystem of claim 12 wherein,
the magnitude generators generate the current magnitudes from inphase components and quadrature components of the sampled signals.

14. A subsystem for use in a receiver of a communications, the subsystem comprising:
a tap delay line for receiving a received signal and for providing delayed received signals;
a clock bank for receiving the delayed received signals and providing respective sampled signals;
an estimator for receiving the sampled signals, determining a maximal one of the sampled signals as a maximal signal, and providing a selection signal for indicating the maximal signal, and
a signal selector for receiving the selection signal and selecting and providing the maximal signal from the sampled signals;
wherein,
the estimator determines mean magnitudes of the sampled signals for determining the maximal one of the sampled signals,
one of the mean magnitudes is a maximal mean magnitude of the mean magnitudes, and
the maximal signal is one of the sampled signals having a maximal signal-to-noise ratio.

15. A subsystem for use in a receiver of a communications, the subsystem comprising:
a tap delay line for receiving a received signal and for providing delayed received signals;
a clock bank for receiving the delayed received signals and providing respective sampled signals;
an estimator for receiving the sampled signals, determining a maximal one of the sampled signals as a maximal signal, and providing a selection signal for indicating the maximal signal; and
a signal selector for receiving the selection signal and selecting and providing the maximal signal from the sampled signals;
wherein,
the tap delay line comprises 0 to N−1 delays for providing N delayed received signals, each of the N delayed received signals equally separated in time,
the delayed received signals are time-staggered replicas of the received signal,
the delayed received signals are N delayed received signals, and
each of the delays is T/N, wherein T is a symbol time duration.

16. A subsystem for use in a receiver of a communications, the subsystem comprising:
a tap delay line for receiving a received signal and for providing delayed received signals;
a clock bank for receiving the delayed received signals and providing respective sampled signals;
an estimator for receiving the sampled signals, determining a maximal one of the sampled signals as a maximal signal, and providing a selection signal for indicating the maximal signal; and
a signal selector for receiving the selection signal and selecting and providing the maximal signal from the sampled signals;
wherein,
the delayed received signals are N delayed received signals,
the clock bank comprises N samplers representing N equal time segments of a symbol time duration,
the sampled signals are N sampled signals,
the sampled signals are $r(kT)$, $r(kT-1 \cdot T/N)$, through $r(kT-(N-1)T/N))$ sampled signals,
k is a symbol index between 0 and K−1,
K is a number of consecutive symbols, and
T is the symbol time duration.

17. A subsystem for use in a receiver of a communications, the subsystem comprising:
a tap delay line for receiving a received signal and for providing delayed received signals;
a clock bank for receiving the delayed received signals and providing respective sampled signals;
an estimator for receiving the sampled signals, determining a maximal one of the sampled signals as a maximal signal, and providing a selection signal for indicating the maximal signal;
a signal selector for receiving the selection signal and selecting and providing the maximal signal from the sampled signals;
wherein the estimator comprises,
mean magnitude generators for generating mean magnitudes from the sampled signals, the mean magnitude generators comprising magnitude generators for generating current magnitudes from the sampled signals, the mean magnitude generators comprising summers for summing prior mean magnitudes with the current magnitudes for generating the mean magnitude, the mean magnitude generators comprising storage elements for storing the prior mean magnitudes for addition by the summers for generating the mean magnitudes, each of the mean magnitude generators comprising a magnitude generator, a summer, and a storage element, the magnitude generator and the summer and the storage element combining as a mean magnitude accumulator for generating the mean magnitudes; and
a maximal selector for receiving the mean magnitudes and providing the selection signal.

* * * * *